Aug. 30, 1966  G. R. ANDERSON  3,269,441
FRUIT CORING AND CALYX TRIMMING APPARATUS
Filed Dec. 26, 1963  5 Sheets-Sheet 1
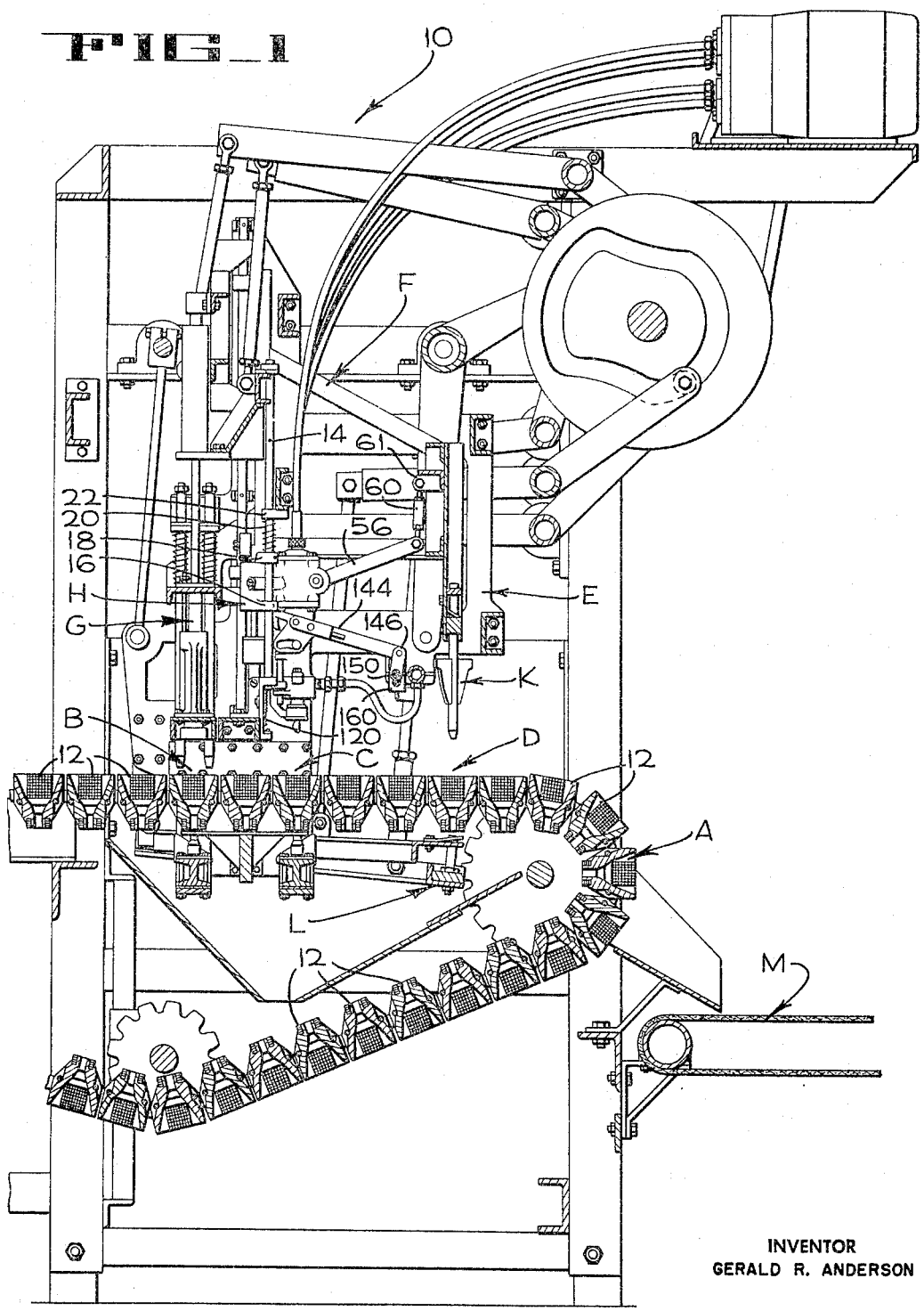
INVENTOR
GERALD R. ANDERSON
BY Hans G. Hoffmeister.
ATTORNEY

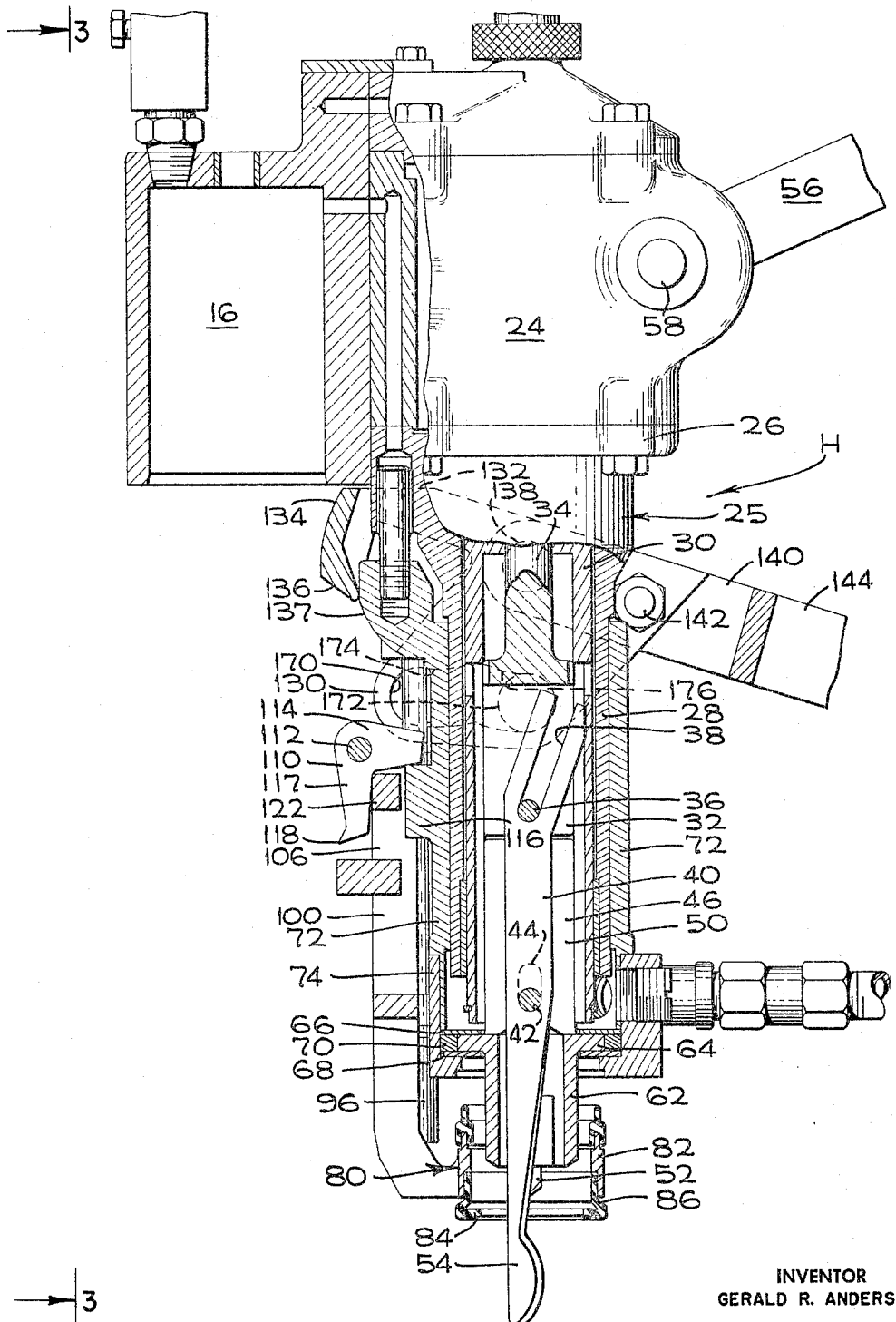
FIG_2

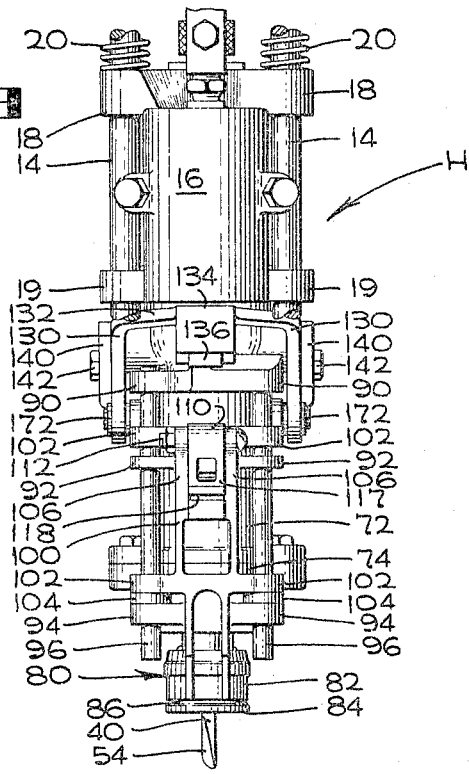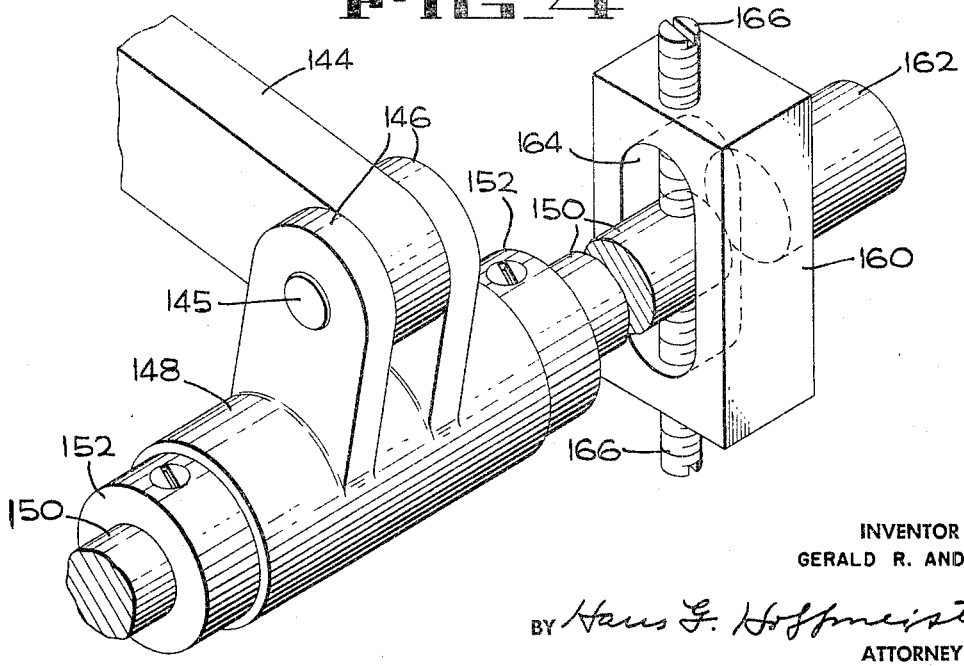

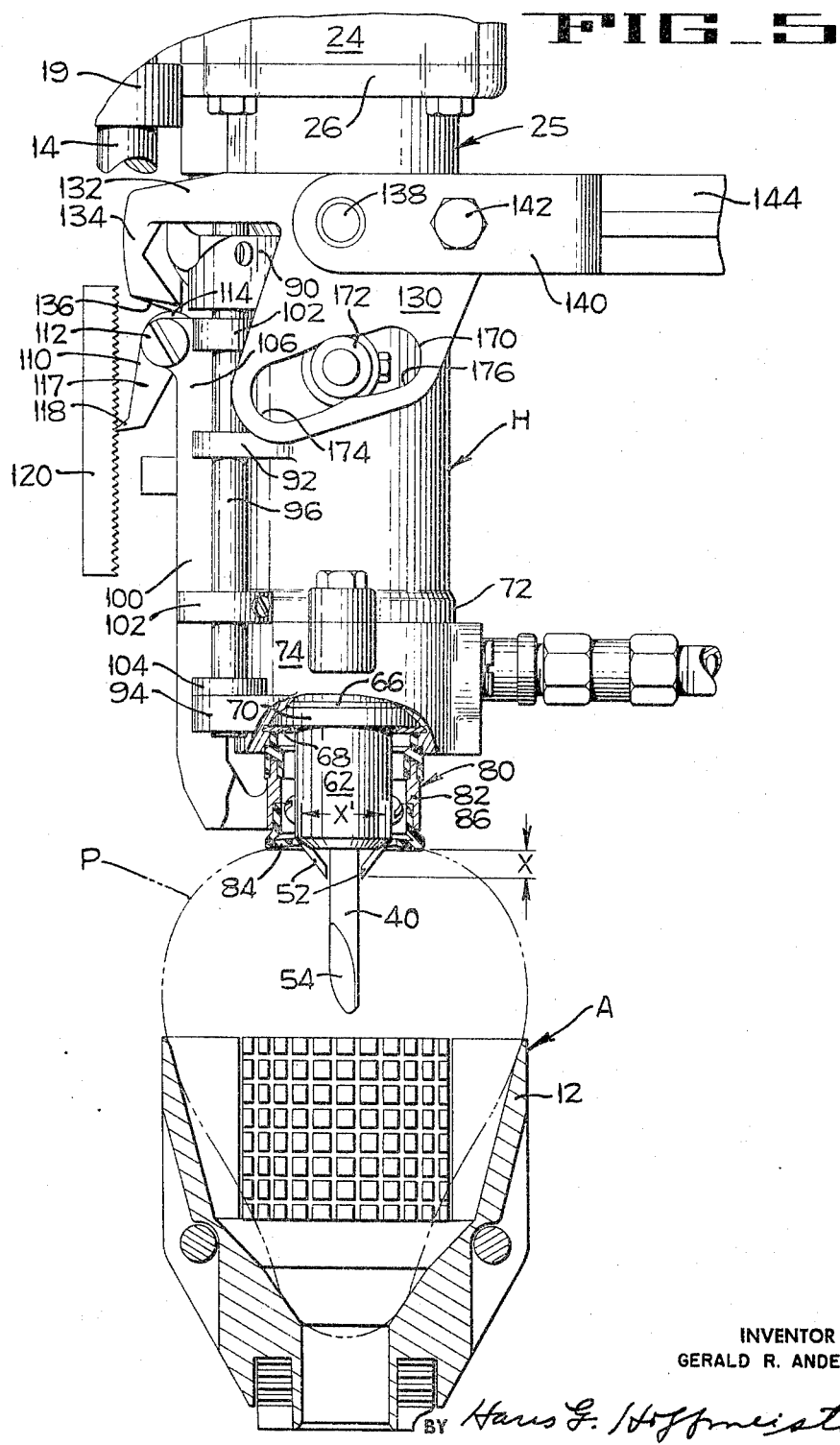

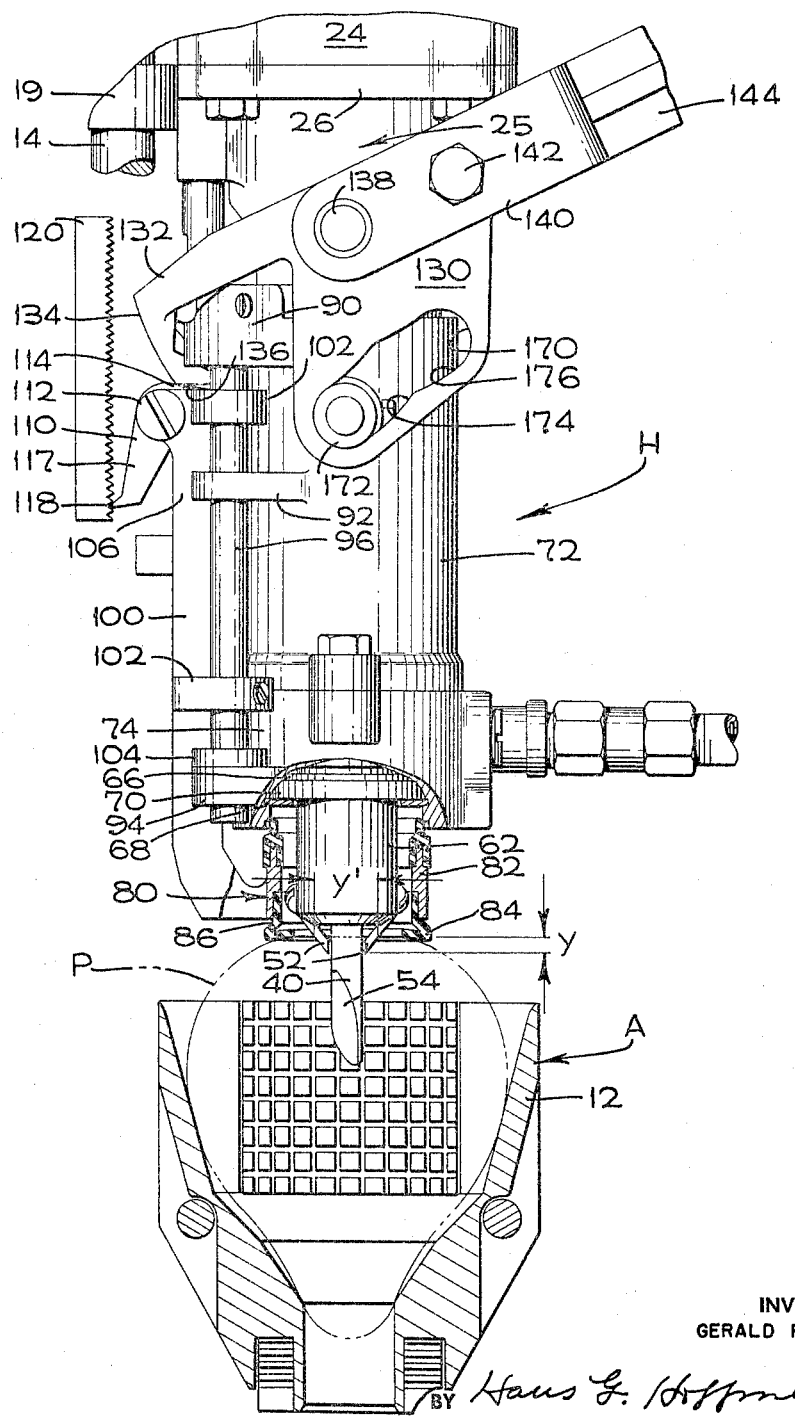

United States Patent Office 3,269,441
Patented August 30, 1966

3,269,441
FRUIT CORING AND CALYX TRIMMING APPARATUS
Gerald R. Anderson, Campbell, Calif., assignor to FMC Corporation, San Jose, Calif., a corporation of Delaware
Filed Dec. 26, 1963, Ser. No. 333,391
11 Claims. (Cl. 146—52)

The present invention pertains to fruit preparation machines and more particularly concerns apparatus for automatically regulating the calyx trimming operation in a pear preparation machine.

The apparatus of the present invention relates to improvements to the pear coring head disclosed in the pending patent application of G. R. Anderson et al. for Apparatus for Processing Fruit, Serial No. 221,174, which was filed on September 4, 1962, now Patent Number 3,199,558, and is assigned to the assignee of the present application.

In the above mentioned coring head, the blossom scars or calyx areas of whole peeled pears are removed by apparatus which makes a circular cut about the stem-blossom axis of each fruit at its calyx end. The apparatus is manually preset to effect different diameters and depths of cuts as is required by the size of the pears. Thus, to eliminate the necessity of making numerous adjustments during a processing run, the pears must be sized and grouped before being processed in the coring head.

The present invention provides apparatus which eliminates the previously required sizing and grouping operations by automatically adjusting the diameter and depth of the calyx cut upon each pear according to the size of the pear.

One of the objects of the present invention is to provide an improved pear coring head for a pear processing machine.

Another object is to provide an improved calyx trimming mechanism for a fruit processing machine.

Another object is to provide calyx trimming mechanism which is automatically regulated to effect a calyx trimming operation in accordance with the size of the fruit.

Another object is to provide a combined calyx trimming and coring apparatus which will accommodate pears having seed cells abnormally close to the calyx, and which will vary the diameter and depth of the calyx cut in proportion to the length of each pear.

Other objects and advantages of the present invention will become evident from the following specification and the accompanying drawings, wherein:

FIGURE 1 is a vertical longitudinal section of the stemming, coring and splitting stations of a pear processing machine incorporating the present invention.

FIGURE 2 is an enlarged elevation, partly broken away of the coring head and automatic calyx trim-adjusting mechanism shown in FIGURE 1.

FIGURE 3 is a rear elevation, at reduced size, of the coring head, the view being taken looking in the direction of arrows 3, 3 of FIG. 2.

FIGURE 4 is an enlarged perspective of an adjustment mechanism for setting both the calyx knives and the coring knife to operate upon pears having various seed cell locations.

FIGURE 5 is a side elevation, partly broken away and in a different operational position, of the coring head shown in FIGURE 2, particularly illustrating the automatic calyx knife adjustment in conjunction with the largest pear to be processed.

FIGURE 6 is a side elevation similar to FIGURE 5, but illustrating the operation of the automatic adjustment for the calyx knives in conjunction with the smallest pear to be processed.

The pear processing machine 10 (FIG. 1) with which the coring head of the present invention may be used, includes a continuous conveyor A which carries multiple lanes of fruit sequentially past a stemming station B, a coring station C and a splitting station D. A carrier frame E swings above the conveyor A in the direction of movement of the conveyor and in timed relation therewith, and carries a vertically movable main support bracket F. A stemming unit G is mounted on the main support bracket F and moves up and down with the bracket to effect the stemming operation at the stemming station B. The coring head unit H of the present invention is indirectly supported by the main support bracket F, the bracket F causing the coring head unit to lower into coring position at the coring station C and to then raise to its retracted position after the fruit is cored.

During the coring operation the fruit is cored and the calyx portion of the fruit is severed to remove the blossom scar. It is the calyx trimming operation to which the present invention pertains, the trimming cut being automatically governed by the size of the pear therebeneath, and the mechanism for effecting the same being part of the coring head H.

After the fruit is cored, it is split into segments by a fruit splitting unit K which descends upon the fruit at the splitting station D. A fruit lifter L then unseats the segmented fruit from the conveyor A and the fruit falls from the conveyor A and is guided by a chute onto a takeaway belt conveyor M at the discharge end of the machine.

More specifically, a plurality of coring heads H are mounted in a row extending transversely across the machine at the coring station, one head being disposed above each longitudinal row of fruit support cups 12 that are formed in a series of transverse chain flights of the conveyor A. Each coring head H is mounted upon a pair of vertical slidably mounted rods 14 (FIGS. 1 and 3) in the same way as the prior coring heads. Thus, the coring head H of the present invention is interchangeable with the prior coring head, and for the purposes of this disclosure the following detailed description of the machine environment for the coring head concerns only those parts necessary for a complete understanding of the invention. It should also be noted at this point that, unless specific attention is directed to particular mechanisms, the structure of the machine is the same as that disclosed in the aforementioned patent application and reference may be had to said application for a detailed description.

Each coring head H (FIG. 3) includes a damping cylinder 16 having projecting upper and lower pairs of mounting tabs 18 and 19, respectively (FIGS. 1 and 3), that are locked, as by setscrews, to the slide rods 14 for elevational movement therewith. A compression spring 20 encircles each slide rod 14, and the ends of the spring bear against the upper tabs 18 and against a block 22 which is carried by the carrier frame E so as to cushion upward movement of the coring head and to overcome lag during initiation of its downward movement.

Each coring head H (FIG. 2) also includes a generally cylindrical housing 24 which is secured to the damping cylinder 16. Housing 24 thus constitutes a main support member for the coring head whereby the head is mounted for elevational movement with the slide rods 14.

The lower portion 25 of the coring head H is of a generally tubular shape and includes a flange 26 which is bolted to the underside of the housing 24, and a tubular lower end portion 28 which encloses a hollow coring shaft 30. Rotatably mounted in the coring shaft 30 is a plunger 34 which has a bifurcated lower end portion defining a slot 32. The plunger 34 is connected to the coring shaft 30 to rotate therewith and to slide relative thereto, as by a pin (not shown) that is carried by the plunger and is slidable in opposed slots in the tubular shaft 30.

A camming pin 36 has end portions disposed in holes in the plunger 34, and has a central portion that extends across the slot 32 and lies within a camway 38 formed by the forked upper end portion of a coring knife 40.

An intermediate portion of the coring knife 40 journals a mounting pin 42 which is received in a slot 44 in each of two legs 46, only the far leg being shown, of a calyx knife holder 50. The ends, not shown, of the mounting pin 42 extend through holes in the adjacent portion of the wall of the hollow coring shaft 30. The coring knife 40 is thus pivotally connected to the coring shaft 30 by the pin 42, and the calyx knife holder 50 can move axially within the coring shaft 30 an amount determined by the limits of the slot 44. This movement positions a pair of calyx knives 52, which are mounted on the lower end of the calyx knife holder 50, a preselected distance from a lower spoon-shaped cutting end 54 of the coring knife 40.

A coring knife actuating lever 56 (FIGS. 1 and 2) is secured to a pivot pin 58 at one side of the housing 24. One end of the lever is connected through a yoke (not shown) to the upper end of the plunger 34. The other end of the lever 56 is pivotally connected by a telescopically adjustable link 60 (FIG. 1) to a fixed part 61 of the main support bracket F. Accordingly, after the head has been lowered into contact with the pear and the bracket F continues moving downwardly, the lever 56 is pivoted clockwise (FIG. 2) about pin 58. Such movement causes the plunger 34 (FIG. 2) to slide upward within the coring shaft 30, whereby the camming pin 36, which is engaged with the camway 38 of the coring knife, causes the coring knife to swing about its mounting pin 42 so that its cutting end 54 follows the contour of the seed cell of the pear.

The calyx knives 52 (FIGS. 2 and 5) are mounted on the inner surface of the tubular neck 62, which is formed on the lower end portion of the calyx knife holder 50, below a projecting radial flange 64 thereof. The flange 64 is mounted between upper and lower thrust washers 66 and 68, respectively, which washers are spaced apart slightly more than the thickness of the flange 64 by a spacer 70. This construction assures that the calyx knife holder 50 is freely rotatable, yet is fixed axially by the thrust washers 66 and 68. Particular attention is called to the fact that because the calyx knives 52 (FIG. 6) converge toward their lower ends, the distance they penetrate a pear will thus determine the diameter of the hole they cut.

The thrust washers 66 and 68 are locked against the lower end of a tubular, non-rotatable depth gauging or control sleeve 72 by a lower end cap 74 which is bolted to the sleeve. The control sleeve 72 is slidably engaged with the tubular housing 28, and means are provided for vertically adjusting the control sleeve 72 whereby the colyx knives 52 are positioned a predetermined distance from the cutting end 54 of the coring knife 40 in accordance with the length of the pear therebeneath.

Adjacent the neck 62 that carries the calyx knives 52 is a pear sensing unit 80, the function of which is to arrest the coring head H when it descends a predetermined distance toward the butt end of the pear. The pear sensing unit 80 includes a depth gauging or control ring 82 which is carried by the control sleeve 72, and is axially movable relative to the sleeve. Bonded to the lower portion of the ring 82 is a flexible rubber guard ring 84 which is adapted to seat upon the butt end of the pear. It will be noted that the ring 84, for a purpose later mentioned, is specifically arranged to collapse a short distance axially by folding along the circumferential juncture at 86 of a flared lower skirt portion and the axial wall of the ring.

Mounting means for the sensing unit 80 (FIG. 3) includes projecting pairs 90 and 92 of apertured lugs that are formed on the control sleeve 72, and a pair of projecting apertured lugs 94 which are formed on the cap 74 and are vertically aligned with the lugs 90 and 92. A tubular support shaft 96 extends through each set of the three vertically aligned lugs 90, 92 and 94 for sliding movement therein. The ring 82 is part of an integral sensing ring support casting 100 which is provided with upper and lower pairs of lugs 102 that are locked on the shafts 96. An oil-soaked felt washer 104 is mounted on each shaft 96 between the adjacent lugs 102 and 94 to cushion the sensing ring support 100 and lubricate the shafts.

The upper portion of the sensing ring support 100 (FIGS. 2 and 3) comprises laterally spaced arms 106, between which a weight-relieving pawl 110 is pivotally mounted upon a bolt 112 that extends between the arms. The pawl 110 has an upper leg 114, which overlies a stop lug 116 that is integrally formed on the control sleeve 72, and a depending leg 117 which is provided with a pointed detent 118 that is adapted to engage a rack 120 (FIGS. 1 and 5) which is rigidly fixed to the carrier frame E. When so engaged, downward movement of the coring head H is arrested and the head is thereby supported during the coring and calyx trimming operation. Attention is called to the fact that the leg 114 of the pawl 110 overbalances the pawl in a direction urging the detent 118 toward the rack 120. However, when the sensing ring support 100 is in its lowermost position (FIG. 2), the stop lug 116 maintains the pawl in a retracted position wherein the detent 118 cannot engage the rack 120 (FIG. 5). Pivotal movement of the pawl toward its retracted position is limited by a stop bar 122 which interconnects the arms 106 of the support 100.

The position of the depth control sleeve 72 (FIG. 2) upon the tubular housing 28 varies during the time the coring head H is descending toward a pear, such movement resulting in progressive downward movement of the calyx knives 52 toward the cutting end 54 of the coring knife 40. The purpose of such adjustment is to provide less inter-spacing between the calyx and coring knives (along the axis which includes the stem-blossom axis of the pear) for a short pear than for a long pear because it is primarily the length of the pear that determines the interspacing of its seed cell cavity and its calyx.

The above mentioned downward movement of the sleeve 72 (FIGS. 2, 3 and 5) over the housing 28 as the coring head H descends is effected by two depth control cam plates 130, one plate being disposed at each side of the coring head. The cam plates 130 are integrally formed with an interconnecting arm 132 which extends around the control sleeve 72 and is provided with a central depending abutment 134 that overlies the pawl 110. As will be explained presently, during an initial part of the downward movement of the head, the abutment 134 subsequently swings counterclockwise to position the lower surface 136 in the path of subsequent upward movement of the leg 114 of the pawl to be engaged thereby when the coring head H attains its operating position relative to the pear, i.e., the position in which the calyx and coring knives carry out their respective functions. It will be noted that the depth control sleeve 72 (FIG. 2) has an arcuate surface at 137 adjacent the abutment 134 so as to provide clearance for the abutment when it swings counterclockwise.

Each cam plate 130 (FIGS. 2 and 5) is pivotally connected to the lower tubular member 25 of the head by means of an associated stub shaft 138 which is secured to and projects from the member 25. The stub shafts 138 lie on a common axis and each shaft projects through an associated cam plate and an adjacent arm of a yoke 140. A bolt 142 completes the attachment of each cam plate to the yoke arm. Yoke 140 is formed on one end of a lever 144 which is pivoted at its other end by a pin 145 to an associated pair of short upstanding links 146 (FIGS. 1 and 4) which are integrally formed on a sleeve 148. The sleeve is freely rotatable on a control shaft 150 which is adjustably mounted upon the carrier frame E. A set collar 152 is locked on the shaft 150 at each end of the sleeve 148 to retain the sleeve against axial movement on the shaft 150.

Means for adjusting the elevation of each end of the control shaft 150 (FIG. 4) relative to the carrier frame E includes two blocks 160, one associated with each end of the shaft. Each block has an outwardly projecting stub shaft 162 that is clamped to the carrier frame E. The inner surface of the block 160 is provided with a vertically elongate slot 164 which receives the end portion of the control shaft 150. Set screws 166 are threaded through the upper and lower ends of the block 160 and abut the control shaft in order to fix its elevational position within the slot 164. This adjustment provides a variable anchor point for the lever 144 which carries the cam plates 130; since the coring head H is mounted for vertical movement relative to the carrier frame E and the control shaft 150 is mounted on the carrier frame, the lever 144 causes pivotal movement of the cam plates 130 (FIGS. 5 and 6) in relation to the coring head H, which cam plate movement is controlled by means including the described mounting for the control shaft 150.

Each cam plate 130 (FIGS. 2, 5 and 6) is provided with a cam follower slot 170 for controlling the position of the control sleeve 72 on the housing 28 according to the elevational position of the coring head H (FIG. 1) relative to the carrier frame E. Thus, a freely rotatable cam follower roller 172 is mounted upon the control sleeve 72 and lies within the associated camming slot 170 so that counterclockwise movement of the cam plates 130 about their pivot axes, the axes of the stub shafts 138, will cause the control sleeve 72 to slide downward over the lower end 28 of the housing as the cam roller engages the left end portion 174 of the slot 170. The right end portion 176 of the slot 170 lies on an arc struck from the axis of the stub shaft 138 and corresponds to the elevated or retracted position (FIG. 2) of the coring head H in the carrier frame E.

*Operation*

When the coring head H (FIG. 2) is in its uppermost position, the sensing ring support 100 is in its lowest position due to gravity, and the upper leg 114 of the weight relieving pawl 110 is resting upon the stop lug 116 of the control sleeve 72. In such position, the pawl is at its extreme counterclockwise attitude, whereby the outer edge of the detent 118 lies in a vertical plane removed from the teeth of the rack 120 therebelow.

Prior to beginning a production run, the distance between the calyx knives 52 and the cutting end 54 of the coring knife can be preset to conform to the average spacing between the seed cell cavities and the calyxes of the pears to be processed. This seed cell to calyx dimension has been found to vary not only according to the variety of the fruit, but is also influenced by their growing conditions such as climate, irrigation, cultivation and so fourth. It is thus desirable to be able to adjust the calyx trimming mechanism and the coring mechanism as indicated, because in this way the maximum fruit yield can be obtained. Accordingly, the control shaft 150 (FIGS. 1 and 4) is vertically adjusted in its mounting blocks 160 and locked in place by the set screws 166. As a result of such adjustment, the lever 144 can be moved, for example, upward from its FIGURE 2 position. The cam roller 172 may be positioned closer to the working end 174 of the cam slot 170 whereby the control sleeve 72 will begin movement earlier. Because downward movement of control sleeve 72 carries the calyx knives 52 toward the cutting end 54 of the coring knife 40, the higher the control shaft 150 is set, the closer together the calyx and coring knives will be for pears of the same length.

FIGURE 5 illustrates the coring head H in conjunction with one of the largest pears P which can be processed. In attaining this position, the cutting end 54 of the coring knife 40 first enters the stemming tube hole, not shown, which is effected by the stemming unit G (FIG. 1) at the previous station of the machine. Next, the rubber gauge ring 84 contacts the butt end of the pear while the coring head is moving downward. The support 100 for the pear sensing unit 80 thus slides upward in relation to the other parts of the coring head, and the weight relieving pawl 110 moves away from the stop lug 116 (FIG. 2) whereby the upper leg 114 of the pawl overbalances the pawl and causes its detent 118 (FIG. 5) to engage with the teeth of the rack 120.

Meanwhile, the cam plates 130 are pivoted clockwise (FIG. 1) due to their pivotal connection to the housing 25 and due to the anchor of the arm 144 to the carrier frame E. In the present instance, this movement only serves to position the cam followers 172 at the left end portions of the non-working cam slots 176 at the time the lower surface 136 of the abutment 134 contacts the upper leg 114 of the weight relieving pawl 110. It is evident, then, that the control sleeve 72 remains in its initial position upon the tubular housing 28 (FIG. 2) when the largest size pear is processed because the cam follower 172 remains in the slot 176 until the abutment 134 cams the weight relieving pawl 110 into locked relation with the rack 120. In this regard, it is to be noted that the abutment surface 136 is so related to the pivot 138 that the abutment strikes the leg 114 of the pawl at a point inward of the pivot axis of the pawl. The detent 118 is thus positively forced laterally into engagement with the teeth of the rack 120 by the weight of the coring head H.

If the detent 118 should happen to strike precisely on the peak of a tooth, which teeth are spaced seventeen to the inch, the detent 118 will be moved down by the weight of the coring head H until the detent engages the next tooth. The rubber guard ring 84 thus folds along its crease line at 86 and thereby accommodates the additional downward movement of the coring head H without damaging the pear. Of course, when the abutment 134 actuates the pawl, the entire weight of the coring head H is supported thereby and the only weight upon the pear is that of the pear sensing unit 80—which is purposely made very light.

In the foregoing example, the calyx knives 52 have penetrated the fruit substantially as far as their total cutting length, that is, to the level of the lower end of the neck 62 to which they are attached. Since the knives converge upon the stem-blossom axis of the pear, the maximum diameter and maximum depth calyx cut is thus effected upon the largest pear. Smaller pears require a calyx cut which is less deep and is of smaller diameter, the operation next described.

When a smaller, and hence shorter pear P (FIG. 6) occupies the feed cup 12, the coring head H will descend to a lower elevation before the rubber ring 84 of the pear sensing unit 80 contacts the pear. As in the previously described case with a large pear, however, the coring head continues to move downward independent of the sensing unit until such time as the lower surface 136 of the abutment 134 contacts the upper leg 114 of the weight relieving pawl 110 and thereby pivots the pawl so that its detent 118 engages the teeth of the rack 120. In attaining such position, the working slots 174 of the cam plates 130 cam their respective cam follower rollers 172 away from the pivot shafts 138. Since the rollers 172 are carried by the depth control sleeve 72, and because the mounting neck 62 for the calyx knives moves with the depth control sleeve 72, the calyx knives 52 are thus moved downward along the shank of the coring knife 40. The interspacing of the coring and calyx knives thus diminishes according to the distance the coring head H descends.

Automatic gauging of the distance the calyx knives 52 will penetrate the pear is a result of the specific relation of the movements of the depth control sleeve 72 and the movable abutment 134. In other words, the working cam slots 174 cam the depth control sleeve 72 downward relative to the coring knife 40 at one speed as the coring head unit descends, but the abutment 134 moves downward relative to the coring knife 40 at a more rapid speed than the depth control sleeve. As a consequence, the lower surface 136 of the abutment 134 overtakes the pawl 110 and causes its detent 118 to lock with the teeth of the rack 120 before the calyx knives 52 penetrate the pear as far as in the operation previously described in conjunction with the large pear shown in FIGURE 5. Thus, whereas the calyx knivs 52 (FIG. 5) have pentrated the butt end of the pear P a distance X, with the small pear P (FIG. 6) the calyx knives 52 penetrate a lesser distance Y.

Since the calyx knives 52 converge toward their lower ends, the diametral distance Y′ between the knives 52 is now less than was formerly the case, as indicated by the difference between distance Y′ and the dimension X′ (FIG. 5). It will thus be seen that the calyx trim cut is effected in accordance with the length of the pear, and that this trim cut is automatically adjusted for all lengths of pears between the smallest and largest pears illustrated. Further, the interspacing of the calyx knives 52 and the cutting end 54 of the coring knife 40 can be preset in the manner previously mentioned, i.e., by adjusting the elevation of the control shaft 150 (FIGS. 1 and 4) whereby the cam plates 130 (FIGS. 5 and 6) are pivotally adjusted relative to their cam follower rollers 172. If this adjustment elevates the shaft 150, the only possible movement in the present example because the rollers 172 initially lie at the ends of the cam slots 176, the rollers 172 will enter the working cam slots 174 with less downward movement of the coring head H. Accordingly, although the coring head H will descend the same distance as in the described examples, the coring knife 40 will not penetrate as deeply into the pear, and pears with seed cells abnormally close to the calyx can thus be efficiently cored. At the same time, the calyx knives 52 carry out their function in the same manner already described and are automatically regulated to remove the calyx according to the length of the pear because their depth regulation feature is independent of the means regulating the coring knife.

While a particular embodiment of the present invention has been shown and described it will be understood that the particular details herein set forth are capable of modification and variation without departing from the principles of the invention and that the scope of the invention should be limited only by the scope and proper interpretation of the claims appended hereto.

The invention having thus been described, that which is believed to be new, and for which protection by Letters Patent is desired, is:

1. In a fruit processing apparatus, means for supporting a fruit with its stem-calyx axis in predetermined orientation, a coring head movable toward said fruit support means along a path in substantial alignment with the stem-calyx axis of the fruit, a rotatable coring knife projecting from said coring head for insertion in the fruit as said head approaches said fruit support means, and means operatively associated with said coring head and responsive to movement of said coring head toward said fruit support means for varying the penetration of the fruit by said coring knife in accordance with the stem-calyx dimension of the fruit.

2. In a fruit processing machine, means for supporting a fruit with its stem-calyx axis in predetermined orientation, a coring head movable toward said fruit support means along a path in substantial alignment with the stem-calyx axis of the fruit, a calyx knife mounted on said coring head and arranged to penetrate the fruit and orbit about said axis, and means connected to said coring head and responsive to movement of said head toward said fruit support means for limiting penetration of said calyx knife into the fruit in accordance with the stem-calyx dimension of the fruit.

3. In a fruit processing apparatus, means for supporting a fruit in predetermined orientation, a coring head movable toward said fruit support means along a path in substantial alignment with the stem-calyx axis of the fruit, a rotatable coring knife mounted on said coring head for insertion in the fruit as said head approaches said fruit support means, a calyx trimming knife carried by said coring head and arranged to penetrate the fruit and orbit about said axis, and means connected to said coring head and responsive to movement of said coring head toward said fruit support means for varying the interspacing of the cutting portions of said coring and calyx knives according to the dimension of the fruit along said axis.

4. In a fruit processing apparatus, means for supporting a fruit in predetermined orientation, calyx severing means adapted to penetrate and cut away the calyx area of the fruit, means mounting said calyx severing means for movement toward and away from said fruit support means, fruit sensing means carried by said mounting means and arranged to be supported and arrested by the fruit upon said downward movement of said mounting means, locking means operatively associated with said fruit sensing means and with said mounting means for preventing relative movement therebetween in accordance with downward movement of said mounting means subsequent to arrest of said fruit sensing means in order to regulate the penetration of the fruit by said calyx knife, and means carried by said mounting means for actuating said locking means at a time coincident with the arresting of said fruit sensing means.

5. In a fruit processing apparatus, a cup for supporting a fruit stem end down and with its stem-blossom axis upright, a coring head mounted above said cup for movement toward and away from said cup, a fruit sensing unit carried by said coring head and mounted for up and down sliding movement relative to said coring head, an abutment mounted on said coring head and movable toward and away from said sensing unit in response to up and down movement of the coring head, a pawl pivotally mounted on said sensing unit in the path of said abutment, and a fixed rack adjacent said pawl, said abutment being arranged to overtake and pivot the pawl into locking engagement with the rack while the coring head descends and subsequent to the time the sensing unit is immobilized by engaging a fruit in said cup.

6. A fruit processing apparatus comprising a main frame, a cup in said frame for supporting a fruit stem end down with its stem-calyx axis upright, a coring head housing mounted above said frame for movement toward and away from said cup in alignment with said axis, a coring knife carried by said housing for movement therewith, a depth control sleeve vertically movable on said housing, a calyx knife depending from said depth control sleeve for orbital movement about an axis coincident with said stem-calyx axis, a fruit sensing unit mounted on said depth control sleeve for vertical movement relative to said sleeve and depending therefrom by gravity, an abutment carried by said housing and movable toward and away from said sensing unit in response to up and down movement of said coring head housing, a pawl pivotally connected to said sensing unit in the path of said abutment, means responsive to downward movement of said housing for moving said abutment and said depth control sleeve downward relative to said housing at respectively different speeds, said abutment descending faster than said sleeve and said fruit sensing unit being held at fixed elevation upon contact with the upper end of the fruit, and a fixed rack mounted adjacent the path of said pawl whereby the abutment overtakes and pivots the pawl into locking engagement with the rack when the calyx knife has penetrated the fruit a distance determined by downward movement of the housing and the abutment carried thereby, and hence a distance regulated by the length of the fruit along its stem-calyx axis.

7. In a fruit processing apparatus a frame, means in said frame for supporting a fruit in predetermined orientation, a coring head mounted in said frame for movement toward and away from said fruit support means, a calyx knife mounted on said coring head and having a distal end adapted to penetrate the fruit, fruit sensing means carried by said coring head for movement upward relative to said knife subsequent to engagement of said sensing means with the fruit, means mounting said coring head in said frame for moving said head toward said fruit supporting means and thus moving said fruit sensing means into engagement with a fruit at a point spaced upward from the distal end of said knife, and abutment means mounted on said coring head and engageable with said fruit sensing means for preventing relative movement between said calyx knife and said sensing means subsequent to the time said sensing means engages the fruit, whereby the penetration of the fruit by the calyx knife is a function of the distance the coring head descends.

8. In a fruit processing apparatus a cup for supporting a fruit stem end down with its stem-calyx axis upright, a coring head mounted over said cup for movement toward and away from said cup, a calyx trimming knife projecting from the lower end of said coring head, a coring knife mounted in fixed axial relation to said coring head and depending therefrom for penetration of the fruit along said stem-blossom axis, a fruit sensing unit carried by said coring head and mounted for up and down movement relative to said head, said sensing unit being adapted to contact a fruit in said fruit support cup and be arrested thereby while said coring head continues to descend, an abutment mounted on said head and movable toward said sensing unit in response to downward movement of said head, a pawl pivotally mounted on said sensing unit in the path of said abutment, a fixed rack adjacent said pawl, said abutment being arranged to overtake and pivot the pawl into locking engagement with the rack after the sensing unit contacts the fruit, and means for varying the distance said calyx knife projects from said coring head in accordance with the elevational position of said head whereby said calyx trimming knife and said coring knife penetrate the fruit a distance proportionate to the interspacing of the seed cell and calyx of the fruit along the stem-calyx axis.

9. In a fruit processing apparatus, means for supporting a fruit stem-end down and with its stem-calyx axis upright, a coring head housing mounted for movement toward and away from said fruit supporting means along a path substantially aligned with said axis, a depth control sleeve slidably mounted on said housing, a calyx knife depending from said sleeve and adapted to penetrate the calyx end of the fruit at one side of said axis and orbit thereabout, fruit sensing means movably connected to said depth control sleeve and arranged to contact the upper end of the fruit upon downward movement of said housing, a pawl pivotally connected to said fruit sensing means, a fixed rack adjacent the path of said pawl and adapted to be engaged by said pawl to lock said sensing means thereto, camming means connected to said housing and engaged with said depth control sleeve for lowering the sleeve relative to said housing upon downward movement of the housing, and abutment means overlying said pawl and connected to said camming means, said abutment means being arranged to descend relative to said housing more rapidly than said depth control sleeve descends relative to said housing whereby the locking pawl is elevationally adjusted according to the height of the fruit and the calyx knife accordingly penetrates the fruit in proportion to the height of the fruit.

10. In a fruit processing machine, a fruit support, a processing head movable toward and away from said support, a fruit sensor carried by said head and arranged to contact a fruit in said support upon movement of said head toward said support, said sensor being displaceable relative to said head when a fruit is thus contacted, a first locking member pivotally connected to said sensor, a second locking member cooperatively associated with and mounted in fixed position adjacent the path of travel of said first locking member, and a lock-actuating lever having at one end portion an abutment surface adjacent said first locking member, at the other end portion a fixed anchor pivot, and intermediate said end portions having a pivotal connection to said head, displacement of said sensor by the fruit causing said abutment surface, while said processing head is moving toward said support, to overtake and actuate said first locking member into locking engagement with said second locking member whereby said lock actuating lever is arrested and the processing head connected to said lever is immobilized from further movement toward said fruit support and is thereby locked in a position governed by the size of the fruit as measured along an axis aligned with the path of movement of said processing head.

11. In a fruit processing machine, means for supporting a fruit in fixed position, a processing head movable toward said support along a predetermined substantially linear path, a lock actuating lever extending substantially normal to said path, said lever having intermediate its ends a pivotal connection to said processing head, means providing a fixed pivotal anchor point for one end portion of said lever remote from said head, the other end portion of said lever being provided with an abutment surface adjacent said head, a fruit sensor carried by said head and arranged to contact a fruit in said support means when said head is moved toward said support means, means mounting said fruit sensor for displacing movement on said head when the head carries the sensor into contact with a fruit, a first locking member pivotally connected to said sensor in the path of said abutment surface, and a second locking member fixedly mounted adjacent the path of travel of said first locking member, said abutment surface being arranged to lie proximate said first locking member during movement of said head so that when the sensor is arrested by contacting the fruit, the abutment surface overtakes said first locking member and pivots said member into engagement with said second locking member to immobilize the processing head in a position related to the size of the fruit along an axis substantially coincident with said path.

References Cited by the Examiner
UNITED STATES PATENTS

| | | | |
|---|---|---|---|
| 2,818,899 | 1/1958 | De Back | 146—81 |
| 3,055,408 | 9/1962 | Harrer et al. | 146—52 |
| 3,078,889 | 2/1963 | Buchner et al. | 146—52 X |

ROBERT C. RIORDON, *Primary Examiner.*

J. SPENCER OVERHOLSER, *Examiner.*

W. G. ABERCROMBIE, *Assistant Examiner.*

Disclaimer 3,269,441.—*Gerald R. Anderson*, Campbell, Calif. FRUIT CORING AND CALYX TRIMMING APPARATUS. Patent dated Aug. 30, 1966. Disclaimer filed Mar. 3, 1969, by the assignee, *FMC Corporation*.
Hereby enters this disclaimer to claims 1, 3, 5, 7 and 8 of said patent.
[*Official Gazette July 8, 1969.*]